Patented Feb. 28, 1933

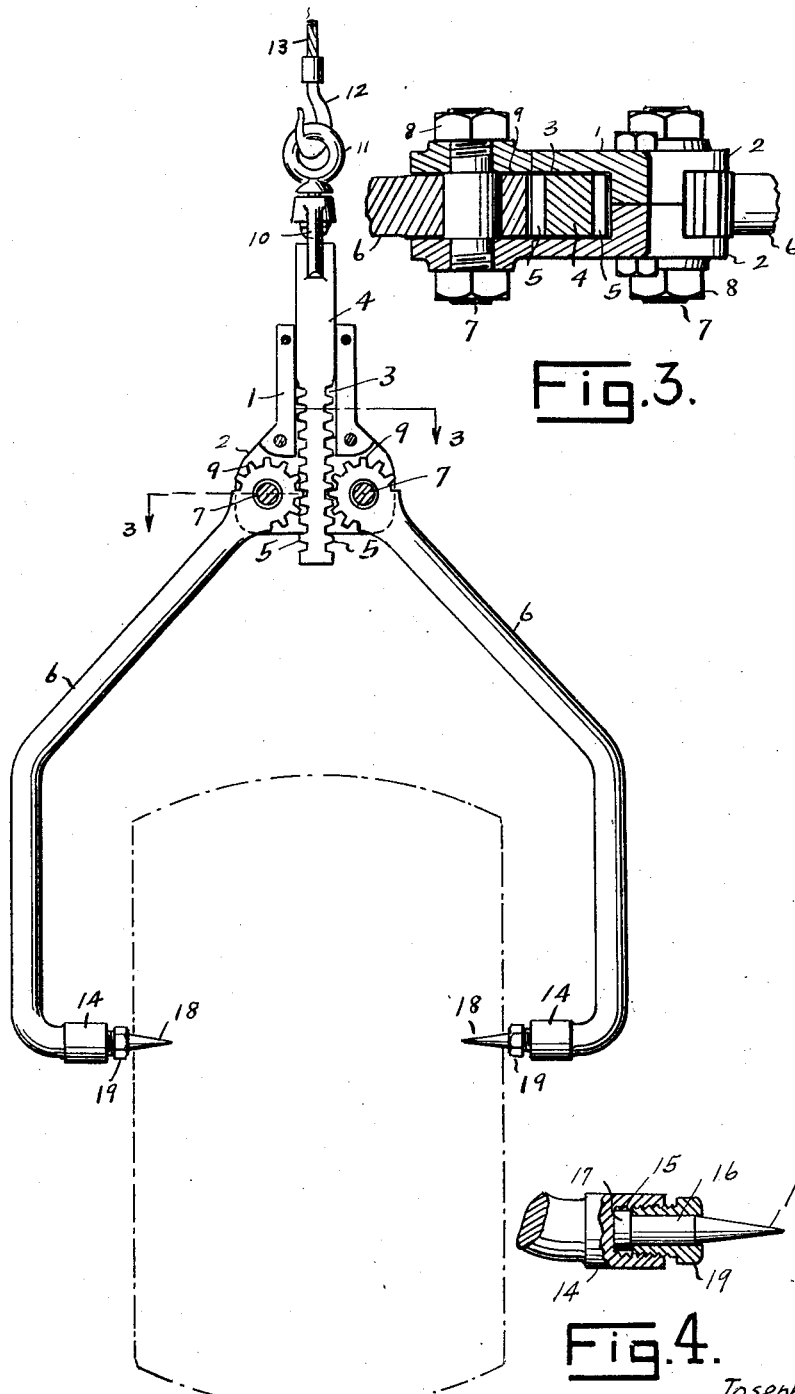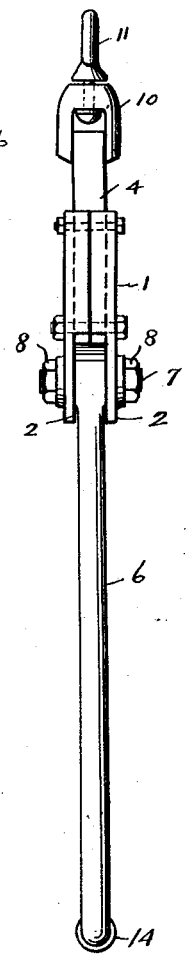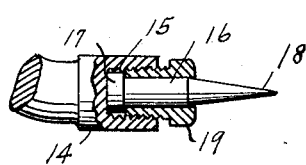

1,899,750

UNITED STATES PATENT OFFICE

JOSEPH W. O. DORMAN, OF HOUSTON, TEXAS

GRAPPLE

Application filed January 8, 1932. Serial No. 585,438.

This invention relates to a grapple.

An object of the invention is to provide a grapple of the character described specially designed for the purpose of engaging and lifting heavy objects such as bales of cotton.

Another object of the invention is to provide a grapple of the character described which will automatically and securely grip and hold the object to be moved.

Another object of the invention is to provide a grapple of the character described having cooperating hooks operatively connected together whereby the hooks may be simultaneously moved into gripping relation with the object, or released.

A further object is to provide a grapple of the character described whose hooks are provided with the removable engaging spikes that may be readily replaced when worn or broken.

With the above and other objects in view, the invention has particular relation to certain novel features of construction, operation and arrangement of parts, an example of which is given in this specification and illustrated in the accompanying drawing, wherein:

Figure 1 shows an elevational view of the grapple shown partly in section.

Figure 2 shows a side view.

Figure 3 shows a transverse fragmentary sectional view taken on the line 3—3 of Figure 1 and Figure 4 shows an enlarged fragmentary sectional view of one of the hooks employed.

In the drawing, the numeral 1 designates the head which is preferably formed of two sections bolted together and depending from which there are the spaced side plates 2, 2. The head has a longitudinal bearing 3 therethrough in which the rack bar 4 is slidably mounted and this bar has the oppositely disposed rack face 5, 5 thereon.

There are the oppositely disposed outwardly curved hooks 6, 6 whose upper ends are mounted to pivot on the bearing rods 7, 7 through the side plates 2 on opposite sides of the rack bar 4. These rods are retained in place by suitable nuts as 8, 8. These ends of the hooks have the arcuate racks 9, 9 formed integrally therewith and in mesh with the rack faces 5. The upper end of the bar 4 has a suitable clevis 10 welded or otherwise secured thereto and an eye 11, has a swivelling connection with said clevis and is provided to receive a hook 12 carried by the lifting cable 13 through which the load is handled in any selected manner.

The other ends of the hooks are inwardly turned and enlarged as at 14 and provided with internally threaded sockets as 15. Fitted into each socket there is a suitable spike as 16, whose inner end has an enlarged head as 17 and whose outer end has the point 18. Glands as 19 are fitted over said spikes and screwed into said sockets, and their inner ends abut the corresponding heads to retain the spikes in place.

In use the grapple may be lowered into position to bring the hooks 6 on opposite sides of the bale and as the bar 4 is then elevated the rack faces 5 will operate through the arcuate rack faces 9 to force the spikes into the object to be lifted. In order to release the hooks the load may be landed on a platform or other support and the cable 13 slightly released and the bar 4 then held stationary and the workman may then grasp one of the hooks 6 and pull it outwardly and this will cause the said head 1 to move upwardly relative to the bar 4, which upward movement will operate through the intermeshing rack faces of the other hook to swing said other hook outwardly to release the object.

The drawing and description disclose what is now considered to be a preferred form of the invention by way of illustration only, while the broad principle of the invention will be defined by the appended claims.

What I claim is:

A grapple including a head formed of sections bolted together, spaced side plates integral with and depending from said sections, said head having a longitudinal bearing aligned with the space between said plates, a rack bar slidable in said bearing and having oppositely disposed rack faces, hooks mounted at one end to pivot between said side plates, arcuate racks formed integrally with the pivoted ends of said hooks and in mesh with said rack faces said hooks having portions which diverge from the head and having outer end portions disposed in parallel relation and whose free ends are turned inwardly, said inwardly turned portions being enlarged and being provided with internally threaded sockets, spikes fitted into said sockets whose inner ends have enlarged heads and whose outer ends are pointed and glands fitted over said spikes and screwed into said sockets whose inner ends abut the corresponding heads to retain said spikes in place.

In testimony whereof I have signed my name to this specification.

JOSEPH W. O. DORMAN.